(12) United States Patent
Mui et al.

(10) Patent No.: US 8,307,101 B1
(45) Date of Patent: Nov. 6, 2012

(54) GENERIC FORMAT FOR STORAGE AND QUERY OF WEB ANALYTICS DATA

(75) Inventors: Lik Mui, Hayward, CA (US); Sagnik Nandy, Sunnyvale, CA (US); David White, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 650 days.

(21) Appl. No.: 12/334,335

(22) Filed: Dec. 12, 2008

Related U.S. Application Data (60) Provisional application No. 61/013,572, filed on Dec. 13, 2007.

(51) Int. Cl.
  *G06F 15/16* (2006.01)
  *G06F 17/30* (2006.01)
  *G06F 7/00* (2006.01)
(52) U.S. Cl. .................. 709/229; 707/709; 707/812
(58) Field of Classification Search ............. 709/229; 707/709, 812
  See application file for complete search history.

(56) References Cited

U.S. PATENT DOCUMENTS

| | | | |
|---|---|---|---|
| 5,752,245 A * | 5/1998 | Parrish et al. ..................... 1/1 |
| 5,946,702 A | 8/1999 | Miyazaki |
| 6,397,263 B1 * | 5/2002 | Hancock et al. .............. 719/322 |
| 6,751,624 B2 | 6/2004 | Christal et al. |
| 7,047,525 B2 | 5/2006 | Prunty et al. |
| 7,103,596 B2 | 9/2006 | Abe et al. |
| 7,523,191 B1 | 4/2009 | Thomas et al. |
| 2001/0012007 A1 | 8/2001 | Breuer |
| 2001/0037266 A1 | 11/2001 | Schroeder |
| 2004/0015891 A1 * | 1/2004 | Arellano-Payne et al. ... 717/137 |
| 2007/0016672 A1 | 1/2007 | Wilson et al. |
| 2007/0067157 A1 | 3/2007 | Kaku et al. |
| 2007/0250618 A1 | 10/2007 | Hammond |
| 2008/0104224 A1 | 5/2008 | Litofsky et al. |
| 2009/0248494 A1 | 10/2009 | Hueter et al. |
| 2010/0299434 A1 | 11/2010 | Hanson et al. |

FOREIGN PATENT DOCUMENTS
JP      2002259370 A     9/2002

\* cited by examiner

*Primary Examiner* — Rehana Perveen
*Assistant Examiner* — Muluemebet Gurmu
(74) *Attorney, Agent, or Firm* — Fish & Richardson P.C.

(57) ABSTRACT

Methods, systems and apparatus, including computer program products, for storing web analytics data in a generic format. Multiple data elements are stored in a database in association with project identifiers, data type identifiers, and index numbers.

29 Claims, 5 Drawing Sheets

GENERIC FORMAT FOR STORAGE AND QUERY OF WEB ANALYTICS DATA

RELATED APPLICATION

This application claims a benefit of priority from U.S. Provisional Patent Application No. 61/013,572, filed Dec. 13, 2007, which is incorporated herein by reference in its entirety.

BACKGROUND

This specification relates to storage and query of web analytics data.

The Internet has evolved from a network of interconnected defense computers, to a relatively sparse network of academic institutions, to the current commercialized worldwide network that it is today. The Internet has developed into a major new medium for not just distributing information, but also for selling and advertising goods and services.

Publishers of web pages, in order to present their content in a manner that is conducive to achieving a website goal (e.g., educating visitors about a given topic, directing visitors to a specific subset of the information on the website, selling goods or services, and/or directing a visitor's attention to one or more included advertisements) often desire specific data regarding how visitors interact with a website. One source of this data is the server logs of a web server hosting a given website. Unfortunately, the information provided by basic server logs is generally limited.

Web analytics systems provide a way for publishers to obtain more detailed information regarding visitor interactions with their site. For example, an analytics provider can supply a website publisher with script code for insertion into one or more web pages for which analytics information is desired. The scripts can direct a visitor's web browser to transmit information to the analytics provider to supply a more complete picture of visitor interactions with the one or more pages than is possible using server logs alone. An analytics provider generally offers a user interface for participating web publishers to access the collected analytics data.

SUMMARY

In general, one aspect of the subject matter described in this specification can be embodied in methods that include the actions of receiving a string including webpage event data from a client device, wherein the event data comprises a plurality of data elements, each data element having a project identifier, a data type, and an index number according to a format of the string, processing the string to extract the data elements, and storing each data element at its indicated index number within its indicated data type in association with its indicated project identifier in a datastore.

In particular implementations the project identifier, the data type, and the index number of a given data element together identify a variable to which that data element corresponds. The datastore can include data for a plurality of project identifiers. The string can include data elements and formatting characters and not include any variable names corresponding to the data elements. The string can be received in an HTTP request. The data types supported by the format of the string can include key data consisting of characters; and value data consisting of integers. The index number of a given data element can determined according to an enumeration order of the format of the string and the location of the given data element in the string. The data type of a given data element can be determined according to an enumeration order of the format of the string and the location of the given data element in the string. The string can not include any characters that require a URL escape code. The webpage event data can include information corresponding to a video displayed on the webpage. The webpage event data can include latency information corresponding to a load time associated with an item displayed on the webpage. The webpage event data can include information corresponding to user mouse movements.

DETAILED DESCRIPTION

Figure 1:
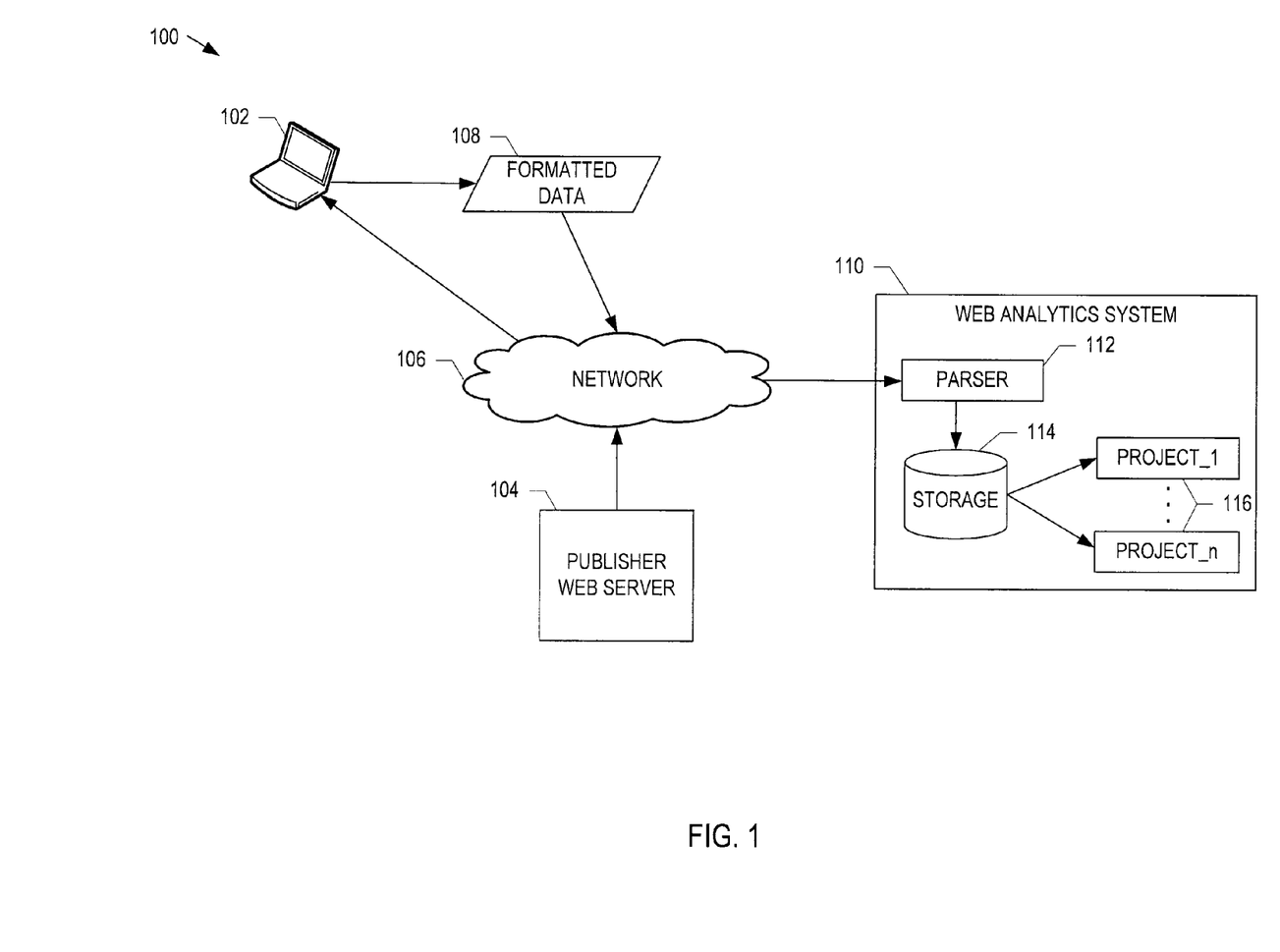
FIG. 1 is an example environment in which a generic storage and query format can be used in conjunction with a web analytics system.

FIG. 1 is an example environment 100 in which a generic storage and query format can be used in conjunction with a web analytics system 110. A user of the computer 102 can direct a web browser program on the computer 102 to a web site served by the web server 104. The web server 104 can respond by sending one or more web pages to the computer 102 for display to the user, with the computer 102 functioning as a user interface device for the user to interact with the one or more web pages. The code of the transferred web pages can include one or more scripts that, depending on user interactions with the web page, instruct the web browser to send formatted data 108 to the web analytics system 110. For example, HTML of a web page served by the web server 104 can include embedded Javascript that causes formatted data 108 to be transferred over the network 106 to the web analytics system 110. In some implementations, one or more HTTP requests are sent to the web analytics system from the computer 102 with a suffix including the formatted data 108. For example, an HTTP request can include a URL appended with a question mark "?" followed by a string of characters.

A parser 112 of the web analytics system can parse the URL and the appended information. The parser extracts data elements from the appended string and stores the extracted data elements in accordance with the generic storage format described below. In some implementations, the received data is stored in association with a hit identifier (hit ID), as a unique key, where each receipt of formatted data is considered a hit. In some implementations, the received data is stored in association with a visit identifier (visit ID, also referred to as a session identifier or session ID). A set of hits can be attributed to a user visit to a web site if, for example, all of the hits correspond to user interactions with the web site that meet predetermined conditions. For example, the conditions can include that all hits of a common visit correspond to user interactions that occur during a period in which the user does not direct a web browser to a different web site, and/or during a period during which the user does not log off of the website (if for example the web site issues the user a login and password). Another example condition can be that all of the hits assigned to a given session are received before a threshold delay has occurred since the last receipt of a hit.

Following extraction of the data elements from the formatted data 108, the extracted data can be stored in a datastore 114 where the extracted data elements are stored according to the rules of the generic storage format. One or more projects 116 can access the stored data to, for example, provide web analytics reporting information.

Web analytics systems collect information on various types of visitor-web page interactions, and as content and presentation formats available on the Internet continue to evolve, the interactions represented by collected data is likely to become even more varied. As publishers request new analytics features and/or advantages of new capabilities are otherwise made apparent, developers, usually working in teams on one or more projects, continually create new capabilities for collecting, analyzing, and reporting analytics data. Unfortunately, the creation of new features often requires changes to existing processing architectures used in the web analytics system. For example, the code of a parsing program may need to be edited and recompiled to support the collection of one or more additional data elements, and/or a corresponding storage format might need to be updated to provide one or more additional fields into which newly collected data is to be stored. Frequent changes of this type and/or individual development of separate processing architectures for respective projects can be wasteful of effort, time, and money.

The use of a generic format for transmitting and storing web analytics data avoids, to at least a degree, code changes and recompilations, and changes to a storage architecture. In some implementations a generic format for storing web analytics data includes storing one or more data elements in association with a respective project identifier (project ID), data type identifier (Data Type ID), and index number. A web analytics system, or an administrator of that system, can assign, for example, an integer project ID to respective projects that use the analytics system to collect data. Data collected for a given project can be stored in association with the corresponding project ID. The system can also store each data element in association with a data type ID and an index number within the indicated data type. A data type can be, for example, a type of variable represented by a given data element, e.g., a string (also referred to as a key), an integer (also referred to as a value), a double (floating point number), and other defined data types. An index number indicates which of the possible elements (of the elements stored by a given project for a specified data type) a given to element represents. For example, a project having a project ID of 1 can store 15 data elements having a data type of "key". An index number of 2 for a key in project ID 1 indicates that a given data element corresponds to the second of the keys stored for project ID 1.

Project teams can keep track of what is represented by the data element stored at any given index number of a given data type having a given project ID, as this information is not stored in association with a given data element. Generalizing data elements in this manner permits the storage format to be efficient (e.g., redundant information is not included) and flexible (e.g., no code changes, or a least a minimal amount of code changes, are needed to support modifications to the number and/or type of variables collected for a given project). Project teams can add new variables and/or change what is represented by a data element of a given type and index number without needing to request changes in processing architecture (e.g., data transfer and storage formats and processes) from administrators of the web analytics system.

Figure 2:
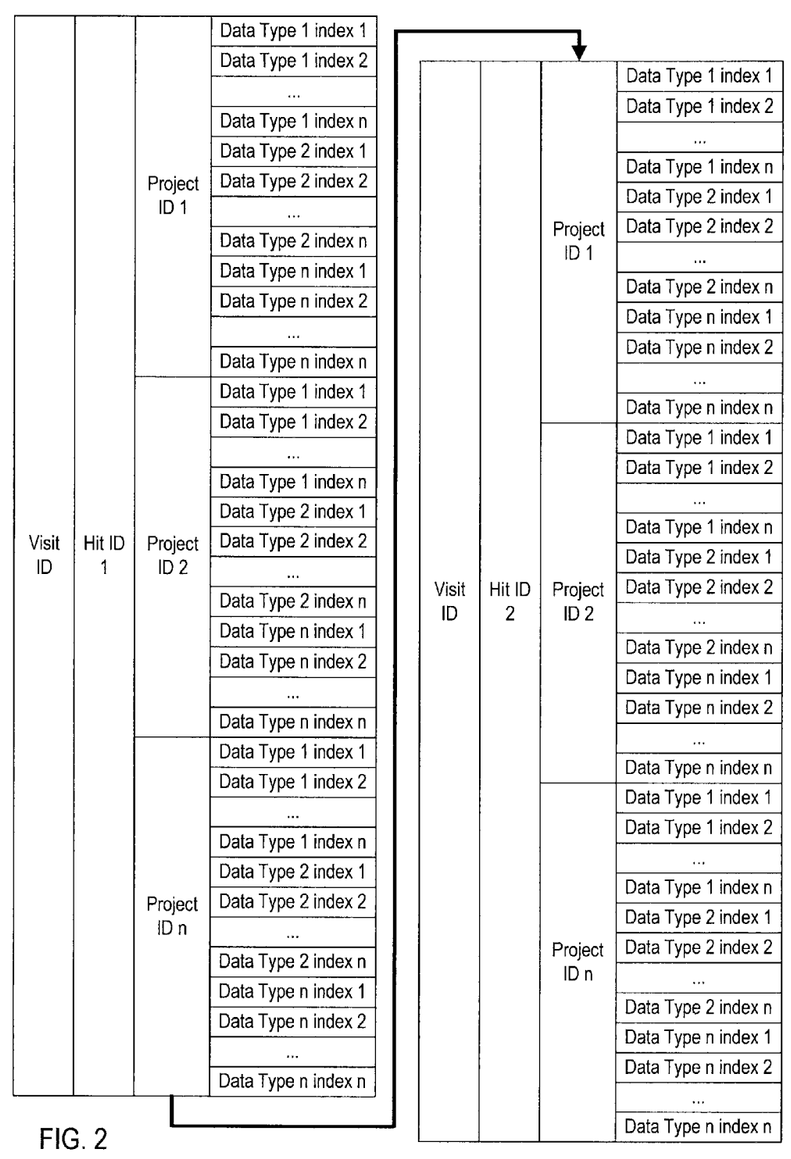
FIG. 2 is a table showing a logical representation of an example web analytics storage format.

FIG. 2 is a table showing a logical representation of an example web analytics storage format. The first column of the table is a visit ID. The second column is a hit ID. A number of hit IDs can share a common visit ID representing, for example, analytics data received in different data transfers (hits) occurring during a user's visit to a web site. The third column is a project ID. Each hit can include data for any number of projects. The fourth column is a data element column. The data element column includes data elements corresponding to any number of data types and index numbers within those data types. The table of FIG. 2 represents logical relationships, not actual physical storage of the data. For a given hit, data is optional for any of the projects supported by the web analytics system, and within a project data is optional for any of the index numbers of the various data types. The data stored for a given hit need not include a record having a column structure as shown in FIG. 2.

Figure 3:
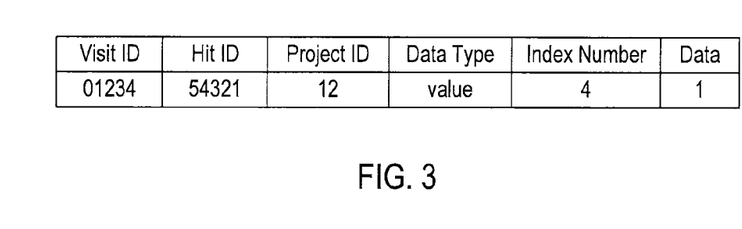
FIG. 3 is a table showing an example of a data element stored in association with a number of identifiers according to a generic web analytics storage format.

FIG. 3 is a table showing an example of a data element stored in association with a number of identifiers according to a generic web analytics storage format. A data element (in this case an integer value of 1) is stored in association with a visit ID, a hit ID, a project ID, a data type ID, and an index number. The visit ID can be, for example, an integer or string that is unique among other visit IDs. The hit ID can be, for example, an integer or string that is unique across all hit IDs. In some implementations, the hit ID serves as a unique key for the stored data. The project ID (12 as shown) indicates the project to which a given data element belongs. The data type indicates the data type (from among the data types supported by the web analytics system) to which the element of data corresponds. The web analytics system can store the data element (in this case the integer 1) in association with a visit ID, a hit ID, a project ID, a data type ID, and an index number to be used for reporting of collected analytics information.

Figure 4:
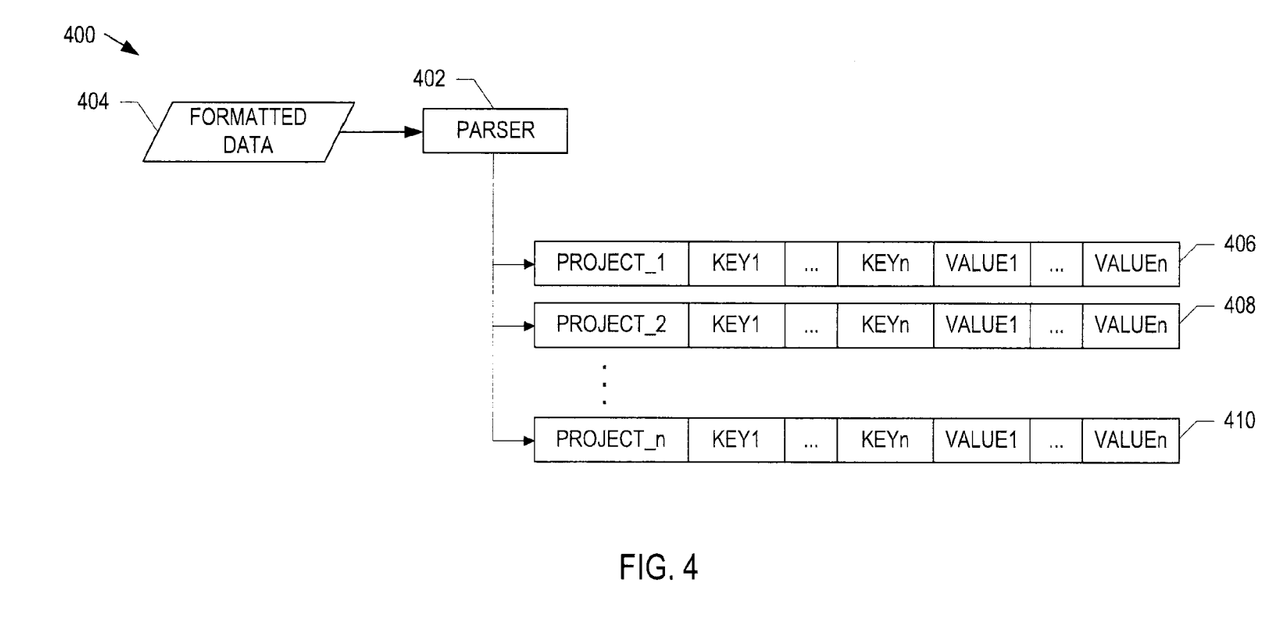
FIG. 4 is a block diagram of an example parser for extracting data elements from formatted data.

FIG. 4 is a block diagram of an example parser 402 for extracting data elements from formatted data 404. In some implementations, two data types are supported by the web analytics system; strings (referred to as keys), and integers (referred to as values). The parser receives formatted data 404 and extracts the data elements. The project data 406, 408, and 410 includes data corresponding to respective project IDs. The web analytics system can use the extracted data to, for example, generate and store records representing the received data. For example, the extracted data can be used to generate records conforming to the logical format shown in FIG. 3. In some implementations, a project ID corresponds to a project and/or team using the web analytics system to track user interactions with one or more web pages. The web analytics system (or administrators thereof) can assign a respective project ID to each project and/or team using the analytics system. In some implementations, the system stores data elements as generic keys and values. To access the data a given team keeps track of their data element to variable mappings. The lack of variable names in the data format permits the format to remain compact and efficient, and a given team can add new variables to their project, and/or modify their variable mapping (also referred to as schema) with little or no changes (e.g., code changes and recompiling) being required to the parsing or storage architecture.

Figure 5:
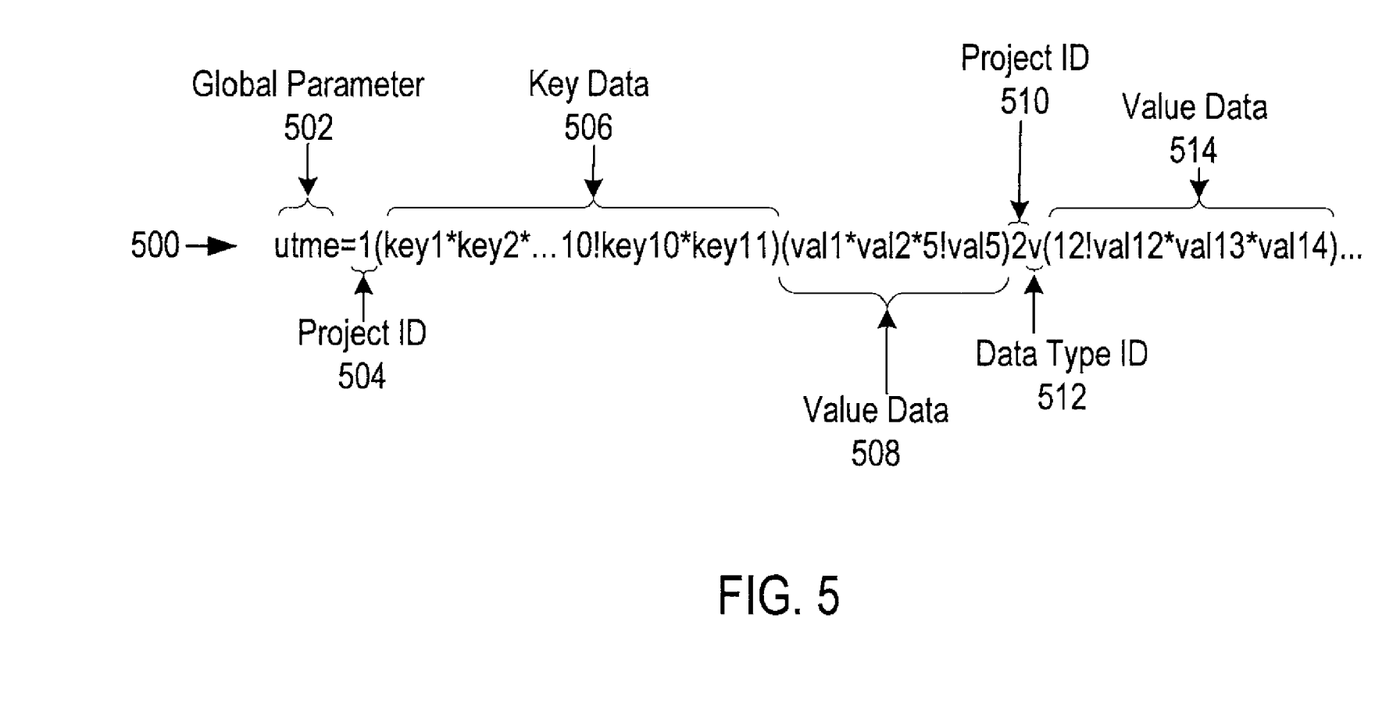
FIG. 5 is an example format for transferring data between a user (also referred to as client) computer and a web analytics system.

FIG. 5 is an example format 500 for transferring data between a user (also referred to as client) computer and a web analytics system. The example data format 500 can be used, for example, to transfer any number data elements belonging to any number of data types (using a series of characters) assigned to any number of project IDs. In some implementations, the transferred characters are ASCII characters. For example, the data format 500 can be used as the format for the formatted data 108 of FIG. 1. The data format 500 shown includes data elements belonging to two data types: keys and values. In the data format 500, the key data type is used to transfer strings of alphabetic characters. The value data type is used to transfer numeric characters. Although the example format shown merely includes two data types, the format can support additional data types. For example, data types of double (for floating point numbers).

The example format begins with a global parameter 302. The global parameter shown is "utme", but the global parameter can be any character or string of characters whose appearance in a string of data is unique in a series of received characters so that it is recognized as the start of a data transfer corresponding to the example format. A string parser, the parser 112 for example, that encounters the global parameter followed by an equal sign ("=") can be programmed to recognize the beginning of a data transfer according to the example format and parse the information that follows accordingly.

The example data format 500 includes project identifiers, data type identifiers, and data groups. A project identifier (project ID) 504 is used to denote that the subsequent data belongs to a specified project. Keys and values received for a given project that are received, for example, at a parsing program, are stored in association with that project to distinguish the data from that of other projects to avoid variable collision between two or more projects. In the example format 500, data that follows the project ID 504 is treated by a parser as corresponding to that project until another project ID is encountered. In some implementations, an initial project ID is required to follow the global parameter and equals sign. A parser reading data sent using the example format can be programmed to treat numeric characters located outside of parentheses "( )" as a project ID.

Parentheses "( )" are used in the example format to enclose groups of data. Within the parentheses the data elements correspond to one of the data types supported by the format. The supported data types can be given an enumeration order corresponding to an order to which a parser, absent an explicit indication in the received data, will assign data elements encountered within the data transfer format. In the example format 500, the enumeration order can be keys then values, meaning that unless explicitly indicated in the data, a first group of data elements will be considered by a compatible parser to be a group of keys, and the next group of data elements will be assumed to be a group of values.

The example format 500 does not include an explicit indication that the first group of data elements corresponds to any given data type. Therefore, (according to an enumeration order of keys then values) the first encountered group of data elements is considered to be a group of keys. The key data 506 in the first data group includes multiple elements delimited by asterisks (*). Unless explicitly indicated in the data, the first encountered key element is treated as belonging to an initial index value. Subsequently encountered key elements in the group are treated as belonging to the previous index value plus one. An explicit index is designated in the example format with an exclamation point "!". Upon encountering an exclamation point, a compatible parser will assign the data element following the exclamation point to the index indicated by the numeric characters preceding the exclamation point. In the example format 500, the key data 506 includes an exclamation point preceded by "10" to indicate that the key element following the exclamation point should be assigned to the key index 10.

The next data group following the key data group 506 is, according to the enumeration order, a value data group. The value data 508 includes three data elements delimited by asterisks. A compatible parser processes value data elements similarly to that of key elements. That is, unless explicitly indicated in the data, a first element is assigned to a first index, and subsequent elements are assigned to the index of the previous element plus one. An index is explicitly indicated using an exclamation point. The value data 508 includes an exclamation point preceded by "5". The value element following the exclamation point is therefore assigned to the value index 5.

The value data 508 is followed by a project ID 510. The project ID 510 of "2" indicates that the data groups enclosed in brackets following the project ID 510 are to be assigned to the project having the project ID of "2". The data type ID 512 of "v" explicitly indicates that the next data group is a value data group. The data type ID 512 is followed by value data 514. The first data element in the value data 514 is explicitly assigned to the index value of 12 and the subsequent elements are assigned to the index of the previous element plus one.

The example data format 500, unlike many transfer formats, does not include variable names (variable names followed by respective values, for example). This decreases the data transfer overhead inherent in the data format 500 as compared to formats that include variable names. The example data format 500 also does not include characters that require the use of an escape sequence when used as part of a URL (for example, concatenated to the end of a URL). Characters that require URL escaping incur a size penalty for use of the escape sequence. For example, a three character escape code is needed to represent a single character when a URL escape code is used. The delimiters of the example data format 500 do not require the use of an escape code for use as a URL suffix, thereby increasing the efficiency of the format. The data format 500 can be used to transfer data to a web analytics system to record visitor interactions with one or more web pages.

An example web page is presented below with examples of events that can be tracked (and event data collected) using a web analytics system that utilized the generic storage format described above. The web page example is followed by examples of queries of the collected data supported by the analytics system and the generic data format.

Figure 6:
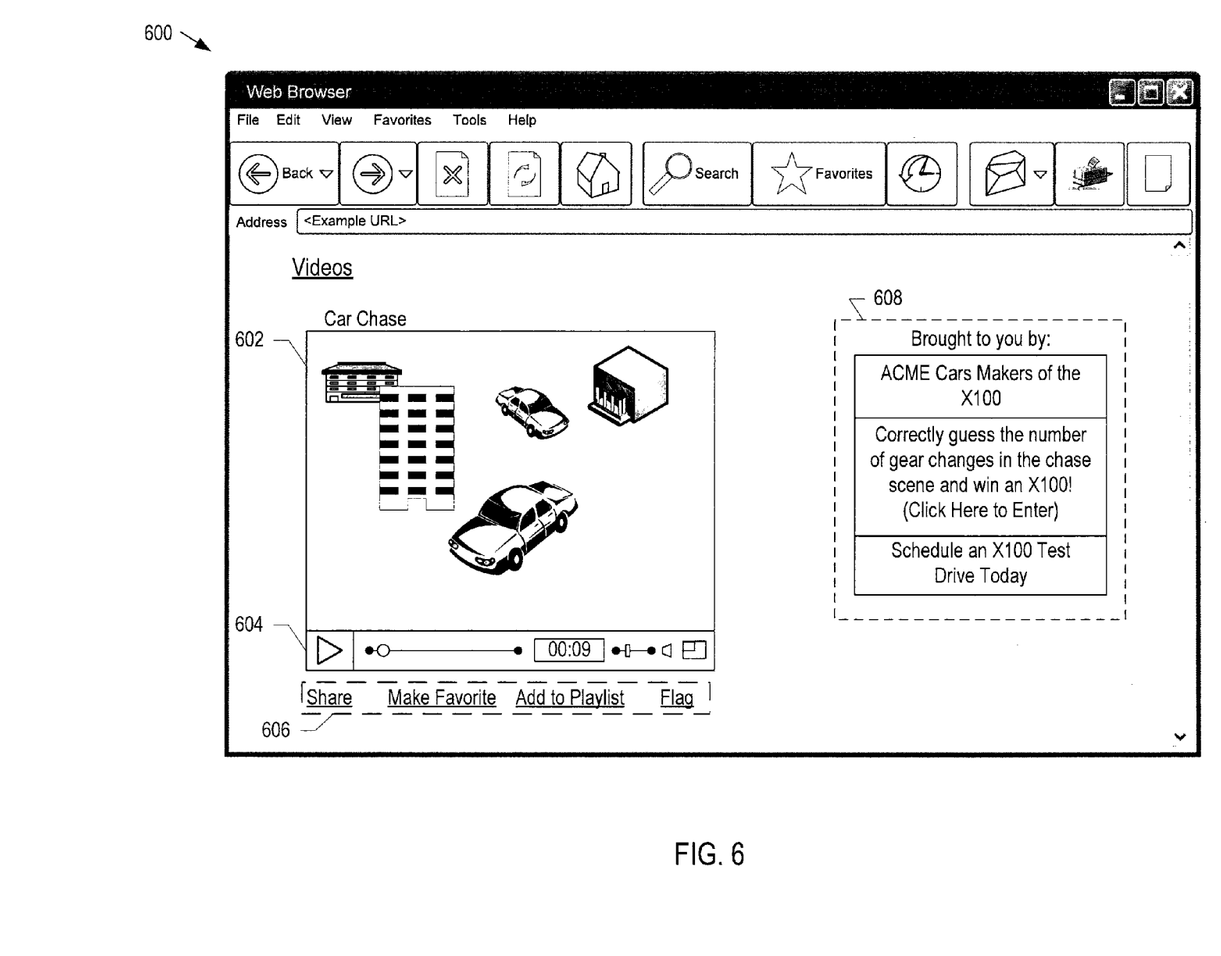
FIG. 6 is an example web page that includes a video player and multiple advertisements configured to have user interactions collected using a web analytics system.

FIG. 6 is an example web page 600 that includes a video player and multiple advertisements configured to have user interactions collected using a web analytics system. The example web page includes a video player 602 having a set of controls 604. A row of links 606 sit beneath the video player, and advertisement region 608 is shown on the right of the web page 600. The code, for example HTML, of the web page 600 can include one or more scripts for use in providing analytics information to a web analytics system. The scripts can be written in, for example, Javascript or other scripting languages capable of being embedded in web page code and handling events, e.g., user interaction events. One or more scripts can be used to send data from the client computer (on which the web page 600 is being displayed) to a web analytics system for collection, storage, and reporting.

In some implementations, scripts embedded in the web page 600 instruct the web browser of the client computer to send analytics data to a web analytics program encoded according to the example format 500 shown in FIG. 5. One or more scripts can be configured to track, for example, how many times a given video was visited (e.g., loaded on a web page), if a user moves a mouse pointer over the advertisement area 608, and/or track a load time (latency) of an animated advertisement appearing on the page.

Assuming that respective project teams desire to track video player events, web page events, and latency, respective project IDs are assigned to each of the projects. For example, a web analytics system assigns project ID 1 to the video tracking project, project ID 2 to the web page event tracking project, and project ID 3 to the latency tracking project. The video project can track, for example, the popularity of videos provided by an online video provider by individual video title and by video author. Online videos are often able to be embedded in any of a number of web pages (e.g., a blog, message board, etc.) For this case, a script of the video player itself can transmit the hit to the web analytics system. To encode the video player information using the format 500, a key having an index number of 1 can be used to represent the name of a video, a key having an index number of 2 can be used to represent the author of a video, and value can be used to represent the occurrence of the load event (so that the value sent is 1 for each occurrence). Upon a video being visited (loaded in a web browser) the data is sent to the web analytics system. For example, a script can request a small (e.g., one pixel by one pixel) image from a web server of the web analytics system having the tracking data encoded in a suffix to the URL of the requested image. For example, for a video entitled "CarChase" having an author "ACMECars" the following string can be appended to the URL by the script, "?utme=1(CarChase*ACMECarCompany)(1)". This transmits the video name, the video author, and the number of load events that occurred to the web analytics system. The web analytics system can parse the appended data, extract the individual data elements, and store them as described with respect to FIG. 3.

The event tracking project can track, for example, any number of user interactions with the web page 600. For a specific example, the tracking of an event wherein a user moves a mouse pointer over an advertisement region will be described. A key having an index number 1 can represent the name of an event, and a value having an index number 1 can represent the number of times the named event occurred (so that the transmitted value is 1 for each occurrence.) Upon a user moving a mouse pointer over the advertisement region, 608 a script embedded in the code of the web page 600 can request a small (e.g., one pixel by one pixel) image from a web server of the web analytics system having the tracking data encoded in a suffix to the URL of the requested image. For example, the following string can be appended to the URL by the script, "?utme=2(MouseOverAd)(1)". This transmits the name of the event that has occurred and the number of occurrences to the web analytics system. The web analytics system can parse the appended data, extract the individual data elements, and store them as described with respect to FIG. 3.

Collected web analytics data, stored in a web analytics system as described above, can be queried to obtain tracking results for use by, for example, web page publishers for use in determining the effectiveness or a particular presentation, or the relative popularity of content offered to visitors. For example, the web page event tracking project team (having the project ID 2) can query the stored data to produce reports that can be provided to web publishers (for example, through a web based reporting interface).

To query the data collected by the system, two or more data elements can be identified for aggregation. For example, to obtain a list of the most popular videos offered by the online video provider described above, event counts in value index number 1 (of project ID 1) can be aggregated across key index number 1 (video name). The result of this aggregation output by the web analytics system is a sum of the value (index number 1) for each unique video name.

This aggregation can be specified (by a project team member for example) by providing an identification of the data elements on which the aggregation will be based to the web analytics system. For example, to specify the above aggregation, a project team member can specify the data elements (keys and value) to be aggregated by indicating the project ID, data type ID, and index number for each. For the most popular video aggregation described above, the project team member can specify that project ID 1, key index number 1 and project ID 1, value index 1 are to be aggregated. In response, the system retrieves all data elements stored in association with project ID 1, a data type of key, and an index number of 1, and sums the integer values stored in association with project ID 1, a data type of value, and an index number of 1 for each unique key (movie name). A value can be attributed to a given key based on being stored with a common hit ID and/or a common visit ID. The output of the example aggregation is a table with a column of movie names and another column that holds the number of times the named movie was viewed as indicated in the collected data.

If multiple keys are specified for an aggregation, the outputted table can include a table of the combinations of the two keys appearing in the collected data for the same hit (and/or visit) and a count of the number of times the combination appears.

Similarly, for the video tracking project (project ID 1) to determine the most popular video authors, data type value, value index number 1, can be aggregated across data type key, index number 2 (video author). For each unique author name found in key index number 2 (for project ID 1) the web analytics system sums the values in index number 1. The system can generate, for example, a table of the results.

To determine the number of times a user moved a mouse pointer of an advertisement region, data type value, index number 1 (of project ID 2) can be aggregated across data type key, index number 1 (event name). For each unique event name found in key index number 1, the web analytics system counts the number of collected occurrences. A table of results, can include a row for "MouseOverAd" showing the number of times the event occurred.

In some implementations, the web analytics system supports pre-aggregation of collected data, based on user defined aggregations (or views) of the data. Pre-aggregation can speed the delivery of requested information as compared to requesting an aggregation of data waiting for the result. For instance, in the examples above (most popular video by visits, most popular video author by visits, and events by number of occurrences) these aggregations can be pre-computed. The web analytics system can support user (i.e., project team) defined views of the data that will be pre-aggregated by the web analytics system and stored for more immediate access. A user can define a view of the data to be pre-aggregated by supplying a project ID and set of keys and values to the web analytics system for pre-aggregation. For example, a set of keys and values specified for performing pre-aggregation can be stored in a file and/or directory of a web analytics system where a system process periodically polls the file and/or directory for pre-aggregation definitions and performs any specified pre-aggregations that are found. The results of the pre-aggregation can be stored in a datastore of the web analytics system for use in, for example, creating reports.

The storage format of the web analytics application further enables aggregations and pre-aggregations to be performed across projects. For example, if one project team is interested in data regarding a type of user interaction that has not been collected by their team, but is being collected by another team using the web analytics system, the first project team can create an aggregation of the collected data based on their own tracked data in combination with data collected by the other team. For example, a user (e.g., a project team member) can specify an aggregation of data by identifying one or more key data elements from a first project, one or more key data elements from a second project, and a value data element from either or both of the projects. The web analytics system can provide aggregated results using collected data from both projects.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer-readable medium. The computer-readable medium can be a machine-readable storage device, a machine-readable storage substrate, a memory device, a composition of matter affecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A system comprising one or more computers operable to:
   receive a string including webpage event data from a client device, wherein the event data comprises a plurality of data elements, each data element having a project identifier, a data type, and an index number according to a format of the string;
   process the string to extract the data elements, the process comprising:
   identifying a first group of data elements associated with a first data type, each data element in the first group having the first data type and having the index number of the respective data element determined in relation to the first group, and
   identifying a second group of data elements associated with a second data type, the second data type being different than the first data type, each data element in the second group having the second data type and having the index number of the respective data element determined in relation to the second group, at least one data element in the second group having an index number that is the same as a data element in the first group; and
   store each data element at its indicated index number within its indicated data type in association with its indicated project identifier in a datastore.

2. The system of claim 1, wherein the project identifier, the data type, and the index number of a given data element together identify a variable to which that data element corresponds.

3. The system of claim 1, wherein the datastore comprises data for a plurality of project identifiers.

4. The system of claim 1, wherein the string includes data elements and formatting characters and does not include any variable names corresponding to the data elements.

5. The system of claim 1, wherein the string is received in an HTTP request.

6. The system of claim 1, wherein the data types supported by the format of the string comprise:
   key data consisting of characters; and
   value data consisting of integers.

7. The system of claim 1, wherein the first data type is determined according to an enumeration order of data types.

8. The system of claim 1, wherein the data type of a given data element is determined according to an enumeration order of the format of the string and the location of the given data element in the string.

9. The system of claim 1, wherein the string does not include any characters that require a URL escape code.

10. The system of claim 1, wherein the webpage event data includes latency information corresponding to a load time associated with an item displayed on the webpage.

11. The system of claim 1, wherein the one or more computers are further operable to:
    generate aggregated results based on the stored data elements; and
    transmit the aggregated results.

12. The system of claim 1, wherein the one or more computers are further operable to:
    generate a pre-aggregated table of results based on at least a specified project ID and a key index number of one data element, and a specified project ID and a value index number of a second data element.

13. A computer-implemented_method comprising:
    receiving a string including webpage event data from a client device, wherein the event data comprises a plurality of data elements, each data element having a project identifier, a data type, and an index number according to a format of the string;
    processing the string, using a computer system, to extract the data elements the processing comprising:
    identifying a first group of data elements associated with a first data type, each data element in the first group having the first data type and having the index number of the respective data element determined in relation to the first group, and
    identifying a second group of data elements associated with a second data type, the second data type being different than the first data type, each data element in the second group having the second data type and having the index number of the respective data element determined in relation to the second group, at least one data element in the second group having an index number that is the same as a data element in the first group; and
    storing each data element at its indicated index number within its indicated data type in association with its indicated project identifier in a datastore.

14. The method of claim 13, wherein the project identifier, the data type, and the index number of a given data element together identify a variable to which that data element corresponds.

15. The method of claim 13, wherein the datastore comprises data for a plurality of project identifiers.

16. The method of claim 13, wherein the string includes data elements and formatting characters and does not include any variable names corresponding to the data elements.

17. The method of claim 13, wherein the string is received in an HTTP request.

18. The method of claim 13, wherein the data types supported by the format of the string comprise:
    key data consisting of characters; and
    value data consisting of integers.

19. The method of claim 13, wherein the index number of a given data element is determined according to an enumeration order of the format of the string and the location of the given data element in the string.

20. The method of claim 13, wherein the first data type is determined according to an enumeration order of data types.

21. The method of claim 13, wherein the string does not include any characters that require a URL escape code.

22. The method of claim 13, wherein the webpage event data includes information corresponding to a video embedded in the webpage.

23. The method of claim 13, wherein the webpage event data includes latency information corresponding to a load time associated with an item displayed on the webpage.

24. The method of claim 13, wherein the webpage event data includes information corresponding to user mouse movements.

25. The method of claim 13, further comprising:
    generating aggregated results based on the stored data elements.

26. The method of claim 25, wherein the aggregated results comprise information corresponding to two or more project identifiers.

27. The method of claim 25, further comprising:
    transmitting the aggregated results to a user.

28. The method of claim 13, further comprising:
  generating a pre-aggregated table of results based on at least a specified project ID and a key index number of one data element, and a specified project ID and a value index number of a second data element.

29. A computer storage medium encoded with computer program instructions that when executed by one or more computers cause the one or more computers to perform operations comprising:
  receiving a string including webpage event data from a client device, wherein the event data comprises a plurality of data elements, each data element having a project identifier, a data type, and an index number according to a format of the string;
  processing the string to extract the data elements, the processing comprising:
    identifying a first group of data elements associated with a first data type, each data element in the first group having the first data type and having the index number of the respective data element determined in relation to the first group, and
    identifying a second group of data elements associated with a second data type, the second data type being different than the first data type, each data element in the second group having the second data type and having the index number of the respective data element determined in relation to the second group, at least one data element in the second group having an index number that is the same as a data element in the first group; and
  storing each data element at its indicated index number within its indicated data type in association with its indicated project identifier in a datastore.

* * * * *

UNITED STATES PATENT AND TRADEMARK OFFICE
CERTIFICATE OF CORRECTION

PATENT NO. : 8,307,101 B1  
APPLICATION NO. : 12/334335  
DATED : November 6, 2012  
INVENTOR(S) : Lik Mui, Sagnik Nandy and David White It is certified that error appears in the above-identified patent and that said Letters Patent is hereby corrected as shown below:

Claim 13, Column 12, Line 3 – delete "computer-implemented_method" and insert -- computer-implemented method --, therefor.

Claim 13, Column 12, Line 10 – delete "elements" and insert -- elements, --, therefor.

Signed and Sealed this  
Fifteenth Day of January, 2013

David J. Kappos  
*Director of the United States Patent and Trademark Office*

UNITED STATES PATENT AND TRADEMARK OFFICE
CERTIFICATE OF CORRECTION

| | | |
|---|---|---|
| PATENT NO. | : 8,307,101 B1 | Page 1 of 1 |
| APPLICATION NO. | : 12/334335 | |
| DATED | : November 6, 2012 | |
| INVENTOR(S) | : Mui et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 777 days.

Signed and Sealed this
Second Day of June, 2015

Michelle K. Lee
*Director of the United States Patent and Trademark Office*